(12) United States Patent
Ueno

(10) Patent No.: US 8,588,072 B2
(45) Date of Patent: Nov. 19, 2013

(54) SWITCH NETWORK SYSTEM, CONTROLLER, AND CONTROL METHOD

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 133 days.

(21) Appl. No.: 13/200,757

(22) Filed: Sep. 30, 2011

(65) Prior Publication Data
US 2012/0020361 A1    Jan. 26, 2012

Related U.S. Application Data

(63) Continuation of application No. PCT/JP2010/072954, filed on Dec. 21, 2010.

(30) Foreign Application Priority Data

Jan. 5, 2010    (JP) .................................. 2010-000368

(51) Int. Cl.
*G01R 31/08*    (2006.01)

(52) U.S. Cl.
USPC ............ 370/235; 370/392; 370/400; 709/223

(58) Field of Classification Search
CPC ..... H04L 45/38; H04L 45/00; H04L 12/4641; H04L 41/0893; H04L 43/026
See application file for complete search history.

(56) References Cited

U.S. PATENT DOCUMENTS

| 7,715,438 B1 * | 5/2010 | Frink et al. ..................... 370/474 |
| 2009/0138577 A1 * | 5/2009 | Casado et al. ................. 709/220 |
| 2010/0257263 A1 * | 10/2010 | Casado et al. ................. 709/223 |

FOREIGN PATENT DOCUMENTS

| JP | 2009-194717(A) | 8/2009 |
| WO | WO 2009/042919 A2 | 4/2009 |

OTHER PUBLICATIONS

International Search Report—FormPCT/ISA/210 dated Jan. 25, 2011.
Nick McKeown et al., "Open Flow: Enabling Innovation in Campus Networks", ACM SIGCOMM Computer Communication Review, vol. 38, No. 2, 2008. (http://www.openflowswitch.org//documents/openflow-wp-latest.pdf).
Hito to Chikyu ni Yasashii Joho Shakai no Jitsugen ni mukete NEC Chuo Kenkyusho no Torikumi, Business Communication, Jan. 1, 2010, vol. 47, No. 1, pp. 111-113.

* cited by examiner

*Primary Examiner* — Jung Park
(74) *Attorney, Agent, or Firm* — McGinn IP Law Group, PLLC

(57) ABSTRACT

A controller has an entry control block and a flow table setting block. In a case where an action of a target entry in a flow table is to be changed to "forwarding of a reception packet to the controller", the entry control block forecasts a load when packets matching the target entry are forwarded to the controller. If the load exceeds a permissible value, the entry control block repeats entry division processing until the load becomes within the permissible value. In the entry division processing, the entry control block divides the target entry into a plurality of post-division entries, divides the match condition of the target entry into a plurality of conditions, and sets respective match conditions of the plurality of post-division entries to the plurality of conditions. The flow table setting block instructs a switch to set the plurality of post-division entries in the flow table.

9 Claims, 10 Drawing Sheets

TBL:FLOW TABLE

| MATCH CONDITION | ACTION |
|---|---|
|  |  |
|  |  |
|  |  |
|  |  |

Fig. 8

| # | pri | MATCH CONDITION | ACTION | COUNTER |
|---|-----|-----------------|--------|---------|
| 1 | 10 | 10.0.0.0/9 | port 1 | 2000 |
| 2 | 20 | 10.128.0.0/9 | port 1 | 1000 |
| 3 | 99 | 0.0.0.0/0 | port 1 | 300 |

Fig. 9

| # | pri | MATCH CONDITION | ACTION | COUNTER |
|---|-----|-----------------|--------|---------|
| 4 | 10 | 10.0.0.0/10 | port 1 | 1500 |
| 5 | 10 | 10.64.0.0/10 | port 1 | 500 |

Fig. 10

| # | pri | MATCH CONDITION | ACTION | COUNTER |
|---|---|---|---|---|
| 6 | 10 | 10.0.0.0/11 | port 1 | 800 |
| 7 | 10 | 10.32.0.0/11 | port 1 | 700 |
| 5 | 10 | 10.64.0.0/10 | port 1 | 500 |

Fig. 11

| # | pri | MATCH CONDITION | ACTION | COUNTER |
|---|---|---|---|---|
| 6 | 10 | 10.0.0.0/11 | controller | 800 |
| 7 | 10 | 10.32.0.0/11 | port 1 | 700 |
| 5 | 10 | 10.64.0.0/10 | port 1 | 500 |

Fig. 12

| # | pri | MATCH CONDITION | ACTION | COUNTER |
|---|---|---|---|---|
| 8 | 1 | 10.1.1.1 | port 1 | 10 |
| 9 | 1 | 10.1.1.2 | port 2 | 20 |
| 6 | 10 | 10.0.0.0/11 | controller | 800 |
| 7 | 10 | 10.32.0.0/11 | port 1 | 700 |
| 5 | 10 | 10.64.0.0/10 | port 1 | 500 |

Fig. 13

| # | pri | MATCH CONDITION | ACTION | COUNTER |
|---|---|---|---|---|
| 9 | 1 | 10.1.1.2 | port 2 | 20 |
| 6 | 10 | 10.0.0.0/11 | controller | 800 |
| 7 | 10 | 10.32.0.0/11 | port 1 | 700 |
| 5 | 10 | 10.64.0.0/10 | port 1 | 500 |

Fig. 14

| # | pri | MATCH CONDITION | ACTION | COUNTER |
|---|---|---|---|---|
| 6 | 10 | 10.0.0.0/11 | port 2 | 800 |
| 7 | 10 | 10.32.0.0/11 | port 1 | 700 |
| 5 | 10 | 10.64.0.0/10 | port 1 | 500 |

SWITCH NETWORK SYSTEM, CONTROLLER, AND CONTROL METHOD

CROSS-REFERENCE TO RELATED APPLICATION

This is a continuation of International Application No. PCT/JP2010/072954, filed on Dec. 21, 2010.

TECHNICAL FIELD

The present invention relates to a technique that controls a switch network system including a switch and a controller.

BACKGROUND ART

Non-Patent Literature 1 (Nick McKeown et al., "Open Flow: Enabling Innovation in Campus Networks", ACM SIGCOMM Computer Communication Review, Vol. 38, No. 2, 2008. (http://www.openflowswitch.org//documents/openflow-wp-latest.pdf)) describes a technique called "Open Flow". In the Open Flow, route control, failure recovery, load distribution and optimization are performed on an individual flow basis. In the Open Flow, an open flow switch serving as a forwarding node and an open flow controller controlling the open flow switch are used.

The open flow switch is provided with a flow table that indicates a correspondence relationship between a "match condition" and an "action", and operates in accordance with the flow table. More specifically, when receiving a packet, the open flow switch refers to the flow table to search the flow table for an entry that matches the received packet. If an entry matching the received packet is registered on the flow table, the open flow switch executes processing designated by the action of the matching entry on the received packet. Typically, the open flow switch forwards the received packet to an output port designated by the action.

It is the open flow controller that controls the flow table of the open flow switch. That is, the open flow controller instructs the open flow switch to carry out such processing as new entry addition, entry change and entry deletion and thereby controls an operation of the open flow switch For example, if there is no matching entry in the flow table, the open flow switch requests the open flow controller for route setting. In response to the route setting request, the open flow controller designs a route of a flow of the received packet. Then, the open flow controller instructs each switch on the designed route to add a new entry such that packet forwarding along the designed route is achieved.

CITATION LIST

Non Patent Literature

Non-Patent Literature 1: Nick McKeown et al., "Open Flow: Enabling Innovation in Campus Networks", ACM SIGCOMM Computer Communication Review, Vol. 38, No. 2, 2008. (http://www.openflowswitch.org//documents/openflow-wp-latest.pdf).

SUMMARY OF INVENTION

Regarding a switch network system such as the above-mentioned Open Flow where a switch and a controller are separated from each other, the inventor of the present application has recognized the following problem.

It is sometimes desired to perform setting of contents of the flow table of a desired switch through the controller. In this case, first, the desired switch is urged to transmit a packet to the controller. Then, in response to the packet, the controller executes predetermined application processing to perform setting of the flow table of the desired switch.

However, in the case where packets are transmitted from the desired switch to the controller, a large amount of traffic may flow into the controller. In general, the application processing on the controller is achieved by a general-purpose CPU executing software and is much slower than packet forwarding processing achieved in the switch by hardware. Therefore, if the switch forwards a large amount of traffic to the controller, the controller side cannot afford to handle the large amount of traffic. As a result, processing load on the controller is increased, which causes inability to perform other important control processing.

In the controller, priority of a task of packet reception may be lowered in order to prevent the inability to perform other important control processing. Alternatively, a size of a packet reception queue may be adjusted to prevent excessive traffic inflow. However, in the cases of such methods, a packet including important information is likely to be missed.

An object of the present invention is to prevent excessive traffic flow into a controller when controlling a flow table of a switch.

In an aspect of the present invention, a switch network system is provided. The switch network system has: a switch configured to perform packet processing by reference to a flow table; and a controller configured to control the flow table of the switch. Each entry in the flow table indicates a match condition and an action. The switch refers to the flow table to execute processing designated by the action on a reception packet that matches the match condition. A target entry in the flow table is an entry whose action is to be changed to "forwarding of the reception packet to the controller".

The controller has an entry control block and a flow table setting block. The entry control block forecasts a load imposed on the controller when packets matching the match condition of the target entry are forwarded to the controller. If the load is within a permissible value, the flow table setting block instructs the switch to change the action of the target entry. On the other hand, if the load exceeds the permissible value, the entry control block repeats entry division processing until the load becomes within the permissible value. In the entry division processing, the entry control block divides the target entry into a plurality of post-division entries, divides the match condition of the target entry into a plurality of conditions, and sets respective match conditions of the plurality of post-division entries to the plurality of conditions. The flow table setting block instructs the switch to set the plurality of post-division entries in the flow table. The entry control block newly sets any of the plurality of post-division entries as the target entry.

In another aspect of the present invention, a controller that controls a flow table of a switch is provided. Each entry in the flow table indicates a match condition and an action. The switch refers to the flow table to execute processing designated by the action on a reception packet that matches the match condition. A target entry in the flow table is an entry whose action is to be changed to "forwarding of the reception packet to the controller".

The controller has an entry control block and a flow table setting block. The entry control block forecasts a load imposed on the controller when packets matching the match condition of the target entry are forwarded to the controller. If the load is within a permissible value, the flow table setting block instructs the switch to change the action of the target entry. On the other hand, if the load exceeds the permissible value, the entry control block repeats entry division processing until the load becomes within the permissible value. In the entry division processing, the entry control block divides the target entry into a plurality of post-division entries, divides the match condition of the target entry into a plurality of conditions, and sets respective match conditions of the plurality of post-division entries to the plurality of conditions. The flow table setting block instructs the switch to set the plurality of post-division entries in the flow table. The entry control block newly sets any of the plurality of post-division entries as the target entry.

In still another aspect of the present invention, a control method that controls a flow table of a switch by a controller is provided. Each entry in the flow table indicates a match condition and an action. The switch refers to the flow table to execute processing designated by the action on a reception packet that matches the match condition. A target entry in the flow table is an entry whose action is to be changed to "forwarding of the reception packet to the controller".

The control method includes: (A) a step of forecasting a load imposed on the controller when packets matching the match condition of the target entry are forwarded to the controller; (B) a step of instructing the switch to change the action of the target entry, if the load is within a permissible value; and (C) a step of repeating entry division processing until the load becomes within the permissible value, if the load exceeds the permissible value. The entry division processing includes: (a) a step of dividing the target entry into a plurality of post-division entries, dividing the match condition of the target entry into a plurality of conditions, and setting respective match conditions of the plurality of post-division entries to the plurality of conditions; (b) a step of instructing the switch to set the plurality of post-division entries in the flow table; and (c) a step of newly setting any of the plurality of post-division entries as the target entry.

In still another aspect of the present invention, a control program that causes the controller to execute the above-mentioned control method is provided.

According to the present invention, it is possible to prevent excessive traffic flow into the controller when controlling the flow table of the switch. As a result, the increase in processing load on the controller is suppressed and thus the inability to perform other important control processing can be prevented from occurring.

BRIEF DESCRIPTION OF DRAWINGS

The above and other objects, advantages and features of the present invention will be more apparent from the following description of certain exemplary embodiments taken in conjunction with the accompanying drawings.

FIG. 8 is a conceptual diagram showing a detailed example of processing according to the present exemplary embodiment.

FIG. 9 is a conceptual diagram showing a detailed example of the processing according to the present exemplary embodiment.

FIG. 10 is a conceptual diagram showing a detailed example of the processing according to the present exemplary embodiment.

FIG. 11 is a conceptual diagram showing a detailed example of the processing according to the present exemplary embodiment.

FIG. 12 is a conceptual diagram showing a detailed example of the processing according to the present exemplary embodiment.

FIG. 13 is a conceptual diagram showing a detailed example of the processing according to the present exemplary embodiment.

FIG. 14 is a conceptual diagram showing a detailed example of the processing according to the present exemplary embodiment.

DESCRIPTION OF EMBODIMENTS

Exemplary embodiments of the present invention will be described below with reference to the attached drawings.

1. Configuration

Figure 1:
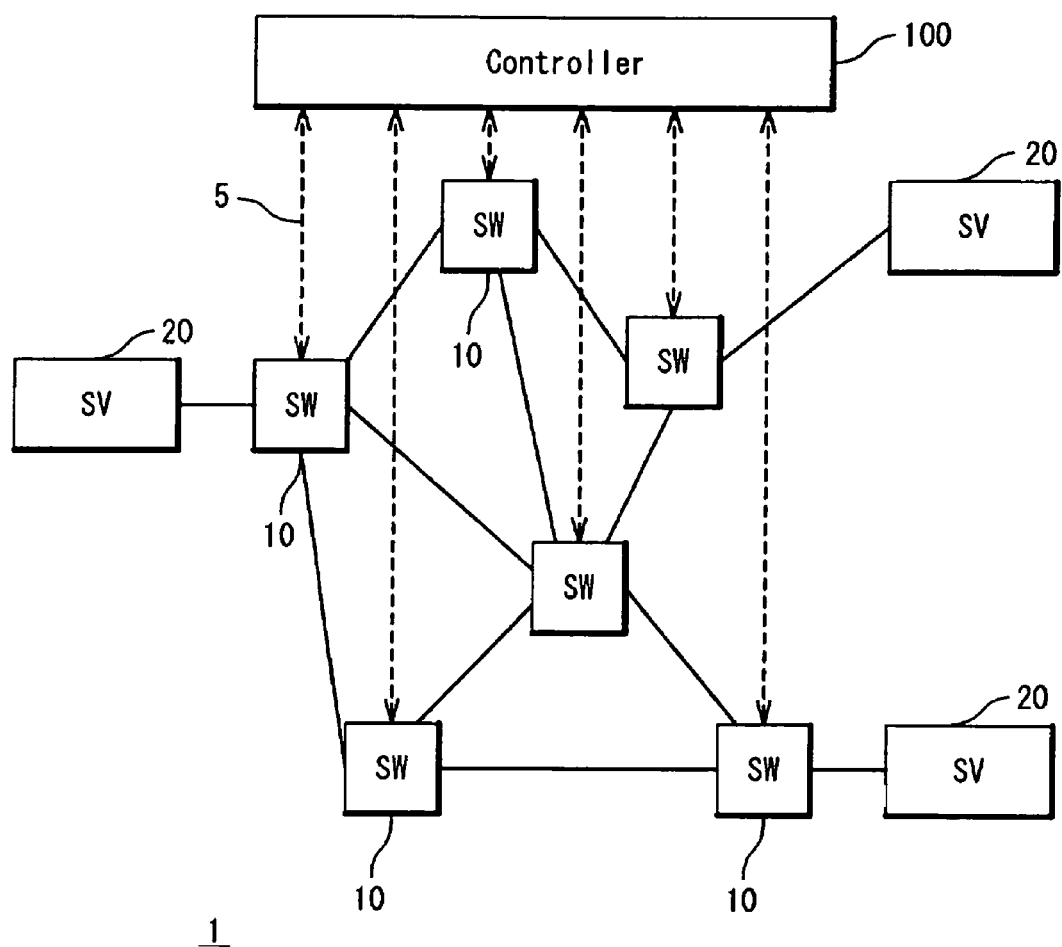
FIG. 1 is a block diagram showing a configuration example of a switch network system according to an exemplary embodiment of the present invention.

FIG. 1 is a block diagram showing a configuration example of a switch network system 1 according to the present exemplary embodiment. The switch network system 1 has switches 10, servers 20 and a controller 100. The plurality of switches 10 are arranged in a network in a distributed manner. The switches 10 are connected by links (lines) to each other, and thus a switch network is configured by the plurality of switches 10. The switch network lies between the plurality of servers 20.

Each of the switches 10 has a flow table and performs packet processing in accordance with the flow table. It is the controller 100 that controls the flow table. The controller 100 is connected to the switches 10 through control links 5 and has a function of setting the flow table of each switch 10 through the control link 5. The controller 100 can appropriately control network communication by controlling operations of the switches through the flow table setting. As an interface between the controller 100 and the switches 10 for achieving the processing described above, Openflow (refer to http://www.openflowswitch.org/) is applicable, for example. In this case, an "Openflow Controller" serves as the controller 100 and an "Openflow Switch" serves as each switch 10.

The switch network system 1 according to the present exemplary embodiment is applied, for example, to a data center.

Figure 2:
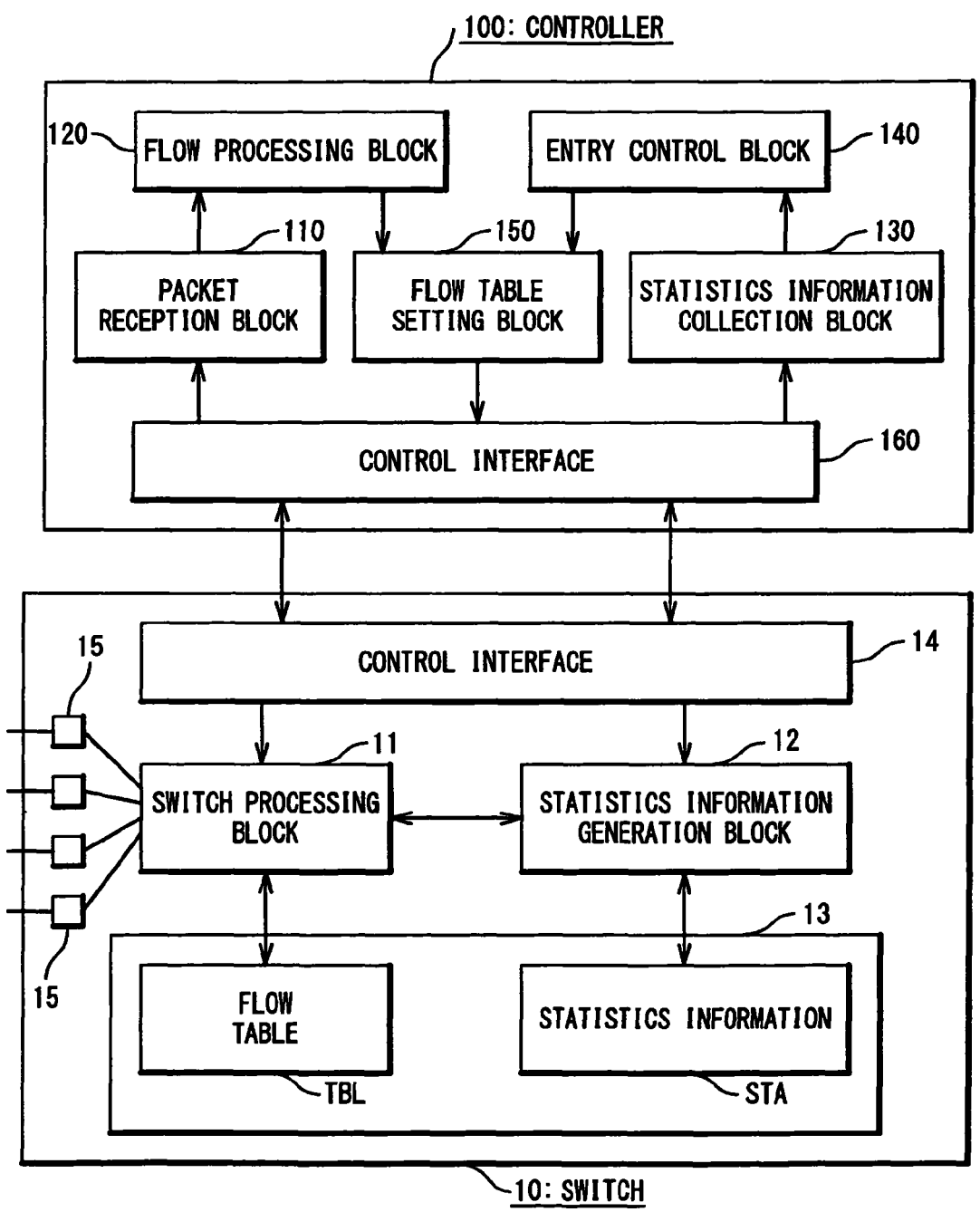
FIG. 2 is a block diagram showing a configuration example of a switch and a controller according to the present exemplary embodiment.

FIG. 2 is a block diagram showing a configuration example of the switch 10 and the controller 100 according to the present exemplary embodiment.

The switch 10 has a switch processing block 11, a statistics information generation block 12, a memory block 13, a control interface 14 and a plurality of ports 15. A port 15 to which a packet is inputted from the outside is an input port, and a port 15 from which a packet is outputted to the outside is an output port. The switch processing block 11 carries out major processing of the switch such as packet forwarding from the input port to the output port. The control interface 14 is connected to the controller 100 through the control link 5, and serves as an interface when communicating with the controller 100.

Figures 3, 4:
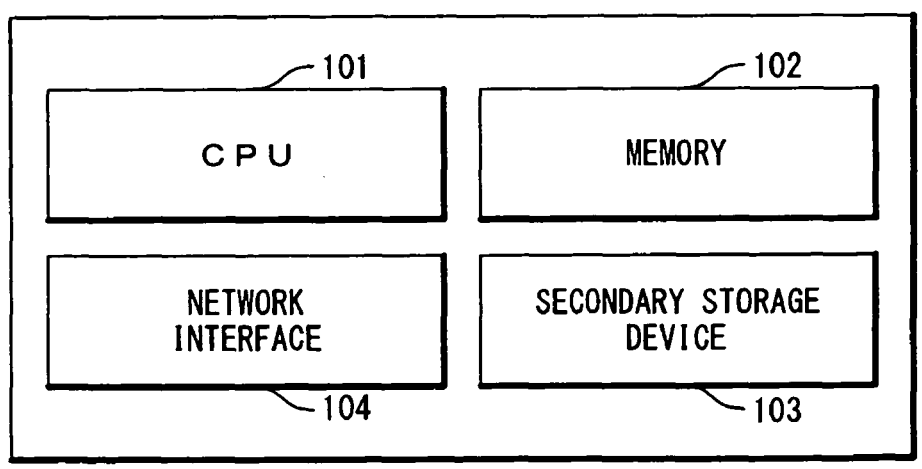
FIG. 3 is a conceptual diagram showing a flow table according to the present exemplary embodiment.
FIG. 4 is a block diagram showing a hardware configuration example of the controller according to the present exemplary embodiment.

A flow table TBL is stored in the memory block 13. As shown in FIG. 3, the flow table TBL has at least one entry, and each entry indicates a "match condition" and an "action". The "match condition" is configured by a combination of parameters such as the input port, a source MAC address, a destination MAC address, a source IP address, a destination IP address, an L4 protocol identifier, a source L4 port number and a destination L4 port number. The "action" indicates contents of processing executed with respect to a packet that matches the match condition.

The switch processing block 11, when receiving a packet through the input port, refers to the flow table TBL stored in the memory block 13. Then, based on header information of the received packet and the like, the switch processing block 11 checks whether or not the received packet matches the match condition of any entry. That is, the switch processing block 11 searches the flow table TBL for an entry that matches the received packet. If the received packet matches the match condition of any entry, the switch processing block 11 executes processing designated by the action of the matching entry on the received packet. Typically, the action indicates an output port (forwarding destination) for the packet, and the switch processing block 11 forwards the received packet to the output port.

Statistics information STA is further stored in the memory block 13. The statistics information STA indicates a match state with respect to each entry in the flow table TBL. The match state includes the number of packets which has matched each entry, that is, a matching count with regard to each entry. The match state may include the number of bytes of the matched packet. The flow table TBL and the statistics information STA may be put together in one table.

It is the statistics information generation block 12 of the switch 10 that generates the statistics information STA. The statistics information generation block 12 generates the statistics information STA based on a status of the packet processing performed by the switch processing block 11. For example, the statistics information generation block 12 has a statistics information counter with respect to each entry of the flow table TBL, and counts the matching count by using the statistics counter. Moreover, the statistics information generation block 12 can also be achieved by a sampling-based statistical processing technique such as sFlow (registered trademark) or NetFlow (registered trademark).

The controller 100 has a packet reception block 110, a flow processing block 120, a statistics information collection block 130, an entry control block 140, a flow table setting block 150 and a control interface 160. The control interface 160 is connected to each switch 10 through the control link 5 and serves as an interface when communicating with each switch 10.

The packet reception block 110 receives a packet from the switch 10 through the control interface 160. The packet reception block 110 transfers the received packet to the flow processing block 120. The flow processing block 120 identifies a flow based on the received packet and executes various kinds of application processing on the flow. Examples of the application processing include route designing and load distribution. Then, the flow processing block 120 instructs the flow table setting block 150 to change settings of the flow table TBL of the switch 10. Contents of the settings change in the flow table TBL vary depending on the application processing.

The statistics information collection block 130 receives the statistics information STA from the switch 10 through the control interface 160. The statistics information collection block 130 transfers the received statistics information STA to the entry control block 140. Based on the statistics information STA, the entry control block 140 executes "load forecasting" and "entry division processing" to be described later. Then, the entry control block 140 instructs the flow table setting block 150 to change settings of the flow table TBL of the switch 10.

In accordance with the instruction from the flow processing block 120 or the entry control block 140, the flow table setting block 150 changes the settings of the flow table TBL of the switch 10. More specifically, the flow table setting block 150 instructs the switch 10 through the control interface 160 to perform setting of the flow table TBL. Contents of the instruction include new entry addition, entry change and entry deletion.

FIG. 4 shows a hardware configuration example of the controller 100. The controller 100 is a computer having a CPU (Central Processing Unit) 101, a memory 102, a secondary storage device 103, a network interface 104 and so on. The packet reception block 110, the flow processing block 120, the statistics information collection block 130, the entry control block 140, the flow table setting block 150 and the control interface 160 described above are achieved by the CPU 101 executing a control program. The control program is a computer program executed by a computer (CPU 101) and stored in the memory 102. The control program may be recorded on a computer-readable recording medium.

2. Processing Flow 2-1. Switch Processing

Figure 5:
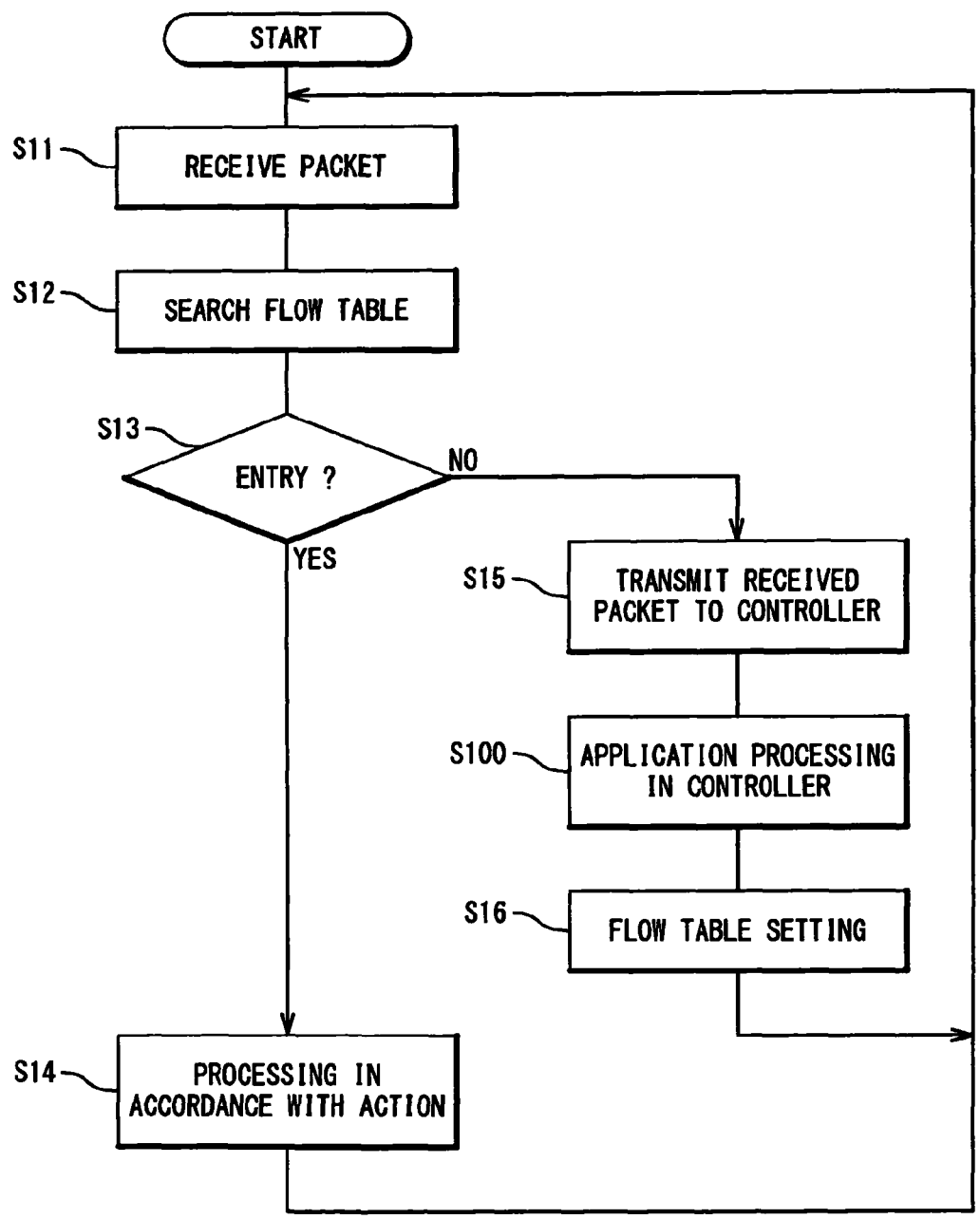
FIG. 5 is a flow chart showing switch processing according to the present exemplary embodiment.

FIG. 5 is a flow chart showing the switch processing according to the present exemplary embodiment. The switch 10 receives a packet of a flow (Step S11). Specifically, the switch processing block 11 receives the packet through the input port. When receiving the packet from the input port, the switch processing block 11 extracts the header information of the received packet. Then, the switch processing block 11 uses the extracted header information and the input port as a search key to searches the flow table TBL for an entry that matches the received packet (Step S12).

If there is an entry matching the received packet in the flow table TBL (Step S13; Yes), the switch processing block 11 executes processing designated by the action of the matching entry on the received packet (Step S14). Typically, the action indicates an output port (forwarding destination) for the packet, and the switch processing block 11 forwards the received packet to the output port. On the other hand, if there is no entry matching the received packet in the flow table TBL (Step S13; No), the switch processing block 11 transmits the received packet (or the header information of the received packet) to the controller 100 through the control interface 14 (Step S15). The switch 10 which transmits the received packet (or the header information of the received packet) to the controller 100 is hereinafter referred to as a "request source switch".

The flow processing block 120 of the controller 100 receives the received packet (or the header information of the received packet) from the switch 10 through the control interface 160 and the packet reception block 110. In response to that, the flow processing block 120 identifies the flow and executes various kinds of application processing on the flow (Step S100). Examples of the application processing include designing a route from the request source switch to the destination. Then, the flow processing block 120 instructs the flow table setting block 150 to change settings of the flow table TBL of a necessary switch 10. The flow table setting block 150 instructs the necessary switch 10 through the control interface 160 to perform setting of the flow table TBL.

Each switch 10 which has received the instruction from the controller 100 sets its own flow table TBL in accordance with the instruction (Step S16). Contents of the instruction include new entry addition, entry change and entry deletion. After that, the controller 100 returns the received packet (or the header information of the received packet) to the request source switch.

2-2. Load Forecasting and Entry Division Processing

It is sometimes desired to change, through the controller 100, contents of a certain entry in the flow table TBL of the switch 10. For example, with regard to a wild card entry which matches a large number of flows, it is sometimes desired to change the action for a part of the flows. An entry whose content is to be changed is hereinafter referred to as a "target entry". In the case, the action of the target entry is once changed to "forwarding of the received packet to the controller 100". The controller 100, when receiving a packet from the switch 10, executes predetermined application processing to set the contents of the flow table TBL to desired ones.

However, during a period when the action of the target entry is being set to the "forwarding of the received packet to the controller 100", all packets that match the match condition of the target entry are forwarded to the controller 100. This causes increase in processing load imposed on the controller 100. Especially, in a case where the target entry is a wildcard entry, a large amount of traffic flows into the controller 100 and thus, in the worst case, the controller 100 cannot afford to execute other important control processing.

Figure 6:
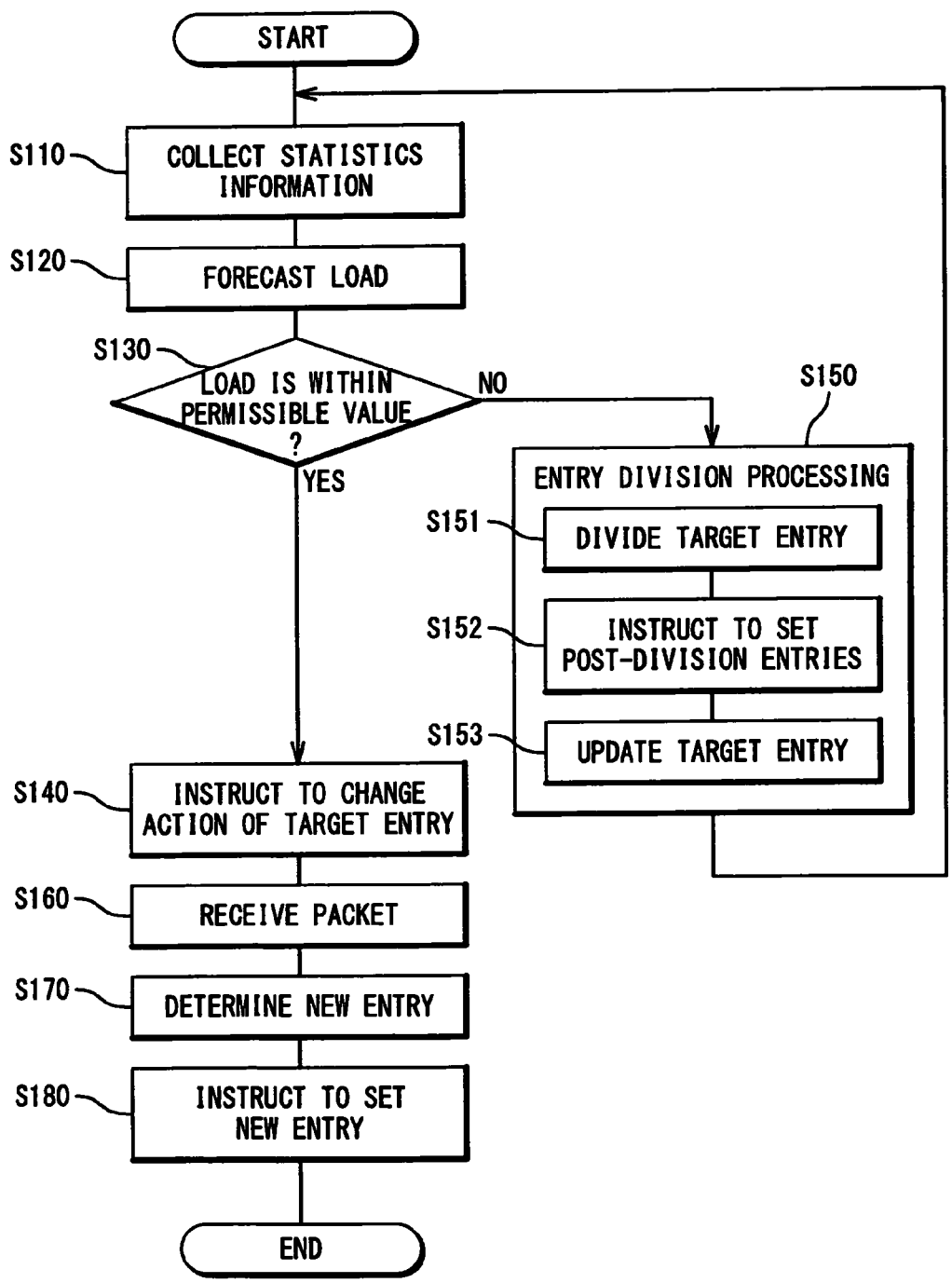
FIG. 6 is a flow chart showing processing including load forecasting and entry division processing according to the present exemplary embodiment.

In order to prevent such a situation from occurring, the controller 100 according to the present exemplary embodiment performs "load forecasting" and "entry division processing". The "load forecasting" and the "entry division processing" will be described with reference to FIG. 6.

Step S110:

The statistics information collection block 130 regularly receives the statistics information STA from the switch 10 through the control interface 160. The statistics information collection block 130 transfers the received statistics information STA to the entry control block 140.

Step S120:

The entry control block 140 forecasts a load imposed on the controller 100 (CPU 101) when packets matching the match condition of the target entry are forwarded to the controller 100. Here, the entry control block 140 forecasts the load based on the above-mentioned statistics information STA. More specifically, the statistics information STA indicates statistics such as the number and bytes of packets that has matched the target entry within a predetermined period of time. Therefore, the entry control block 140 can calculate a packet rate and a bandwidth by integrating the statistics. Furthermore, the entry control block 140 can forecast the load imposed on the CPU 101 by referring to a correspondence table between packet rates and loads that is prepared beforehand.

Step S130:

The entry control block 140 compares the forecasted load and a permissible value to determine whether or not the forecasted load is within the permissible value.

Step S140:

If the forecasted load is within the permissible value (Step S130; Yes), the entry control block 140 instructs the flow table setting block 150 to change settings of the target entry. Further, the flow table setting block 150 instructs the switch 10 through the control interface 160 to change the action of the target entry. More specifically, the flow table setting block 150 instructs the switch 10 to change the action of the target entry to "forwarding of the received packet to the controller 100". In accordance with the instruction, the switch 10 changes the action of the target entry to "forwarding of the received packet to the controller 100".

Step S150:

On the other hand, if the forecasted load exceeds the permissible value (Step S130; No), the entry control block 140 executes the "entry division processing". More specifically, the entry division processing (Step S150) includes the following Steps S151 to S153.

Step S151:

The entry control block 140 divides the target entry into a plurality of partial entries. The action of each partial entry is the same as the action of the target entry. Whereas, a match range that matches the match condition of the partial entry is a part of a match range that matches the match condition of the target entry. That is, the entry control block 140 divides the match condition (match range) of the target entry into a plurality of conditions (ranges), and sets the match conditions of the plurality of partial entries respectively to the plurality of conditions. For example, the entry control block 140 divides an IP address range indicated by the match condition of the target entry into a plurality of partial ranges, and sets the plurality of partial ranges as the respective match conditions of the plurality of partial entries. The partial entry is hereinafter referred to as a "post-division entry".

Step S152:

The entry control block 140 instructs the flow table setting block 150 to set the plurality of post-division entries obtained in Step S151. Further, the flow table setting block 150 instructs the switch 10 through the control interface 160 to set the plurality of post-division entries in the flow table TBL. The switch 10 sets the plurality of post-division entries in the flow table TBL in accordance with the instruction.

Step S153:

The entry control block 140 sets any of the plurality of post-division entries as a new target entry. That is, the entry control block 140 updates the target entry. After that, the processing returns back to Step S110.

In the manner, the entry control block 140 repeats the entry division processing (Step S150) until the forecasted load associated with the target entry becomes within the permissible value.

Step S160:

In Step S140 described above, the action of the target entry is changed to "forwarding of the received packet to the controller 100". After that, the reception packets that match the match condition of the target entry in the switch 10 are transmitted to the controller 100. The flow processing block 120 of the controller 100 receives the reception packets from the switch 10 through the control interface 160 and the packet reception block 110. At this time, since the forecasted load associated with the target entry is within the permissible value as described above, it is expected that excessive traffic inflow is prevented from occurring.

Step S170:

In response to the received packet, the flow processing block 120 executes predetermined application processing to determine new contents of the flow table TBL. More specifically, the flow processing block 120 identifies a flow of the received packet and determines a desired new entry with regard to the flow.

Step S180:

The flow processing block 120 instructs the flow table setting block 150 to set a new entry. The flow table setting block 150 instructs the switch 10 through the control interface 160 to set the new entry in the flow table TBL. The switch 10 sets the new entry in the flow table TBL in accordance with the instruction. In the manner, the contents of the flow table TBL are changed to desired ones.

According to the present exemplary embodiment, as described above, when the contents of the flow table TBL of the switch 10 is to be changed, the controller 100 forecasts the amount of traffic that it will receive. Then, if the controller 100 determines that the inflow traffic is too match to handle, the controller 100 executes the entry division processing to reduce the match range of the target entry. It is thus possible to prevent excessive traffic flow into the controller 100. As a result, the increase in processing load on the controller 100 is suppressed and thus the inability to perform other important control processing can be prevented from occurring. Moreover, such a situation as a packet including important information is missed can be prevented from occurring.

2-3. Entry Deletion Processing

Figure 7:
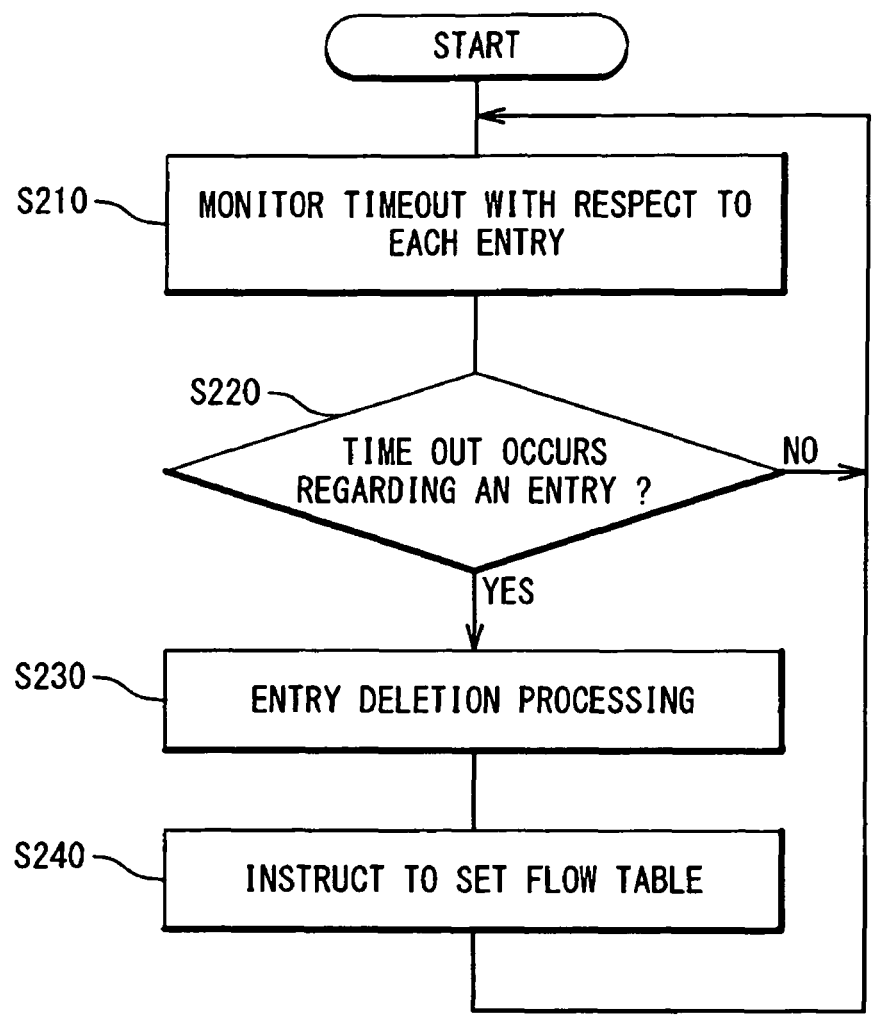
FIG. 7 is a flow chart showing processing including entry deletion processing according to the present exemplary embodiment.

Next, the entry deletion processing will be described with reference to FIG. 7.

Step S210:

The entry control block 140 of the controller 100 calculates a "non-traffic period" with respect to each entry, by using the statistics information and a built-in timer. The non-traffic period is a period during which no traffic flows.

Step S220:

If the non-traffic period regarding an entry exceeds a predetermined threshold value, that is, if time-out occurs regarding an entry, the processing proceeds to Step S230.

Step S230:

The entry control block 140, when detecting the entry where time-out occurs, instructs the flow table setting block 150 to delete the detected entry. Also, if entry integration or the like is necessary at this time, the entry control block 140 instructs the flow table setting block 150 to do it as well.

Step S240:

The flow table setting block 150 instructs the switch 10 through the control interface 160 to perform setting of the flow table TBL. More specifically, the flow table setting block 150 instructs the switch 10 to delete the above-mentioned detected entry from the flow table TBL and also instructs to perform entry integration as necessary. The switch 10 performs setting of the flow table TBL in accordance with the instruction.

3. Processing Example

An example of operation of the flow table TBL will be described with reference to FIGS. 8 to 14. Each of FIGS. 8 to 14 shows an entry number (#), priority (pri), the match condition and the action included in the flow table TBL and the matching count (count value) included in the statistics information STA. Note that the match condition is given by a range of the source IP address. Notation of the address range is prefix notation, i.e., [the beginning IP address of the address range]/[prefix value]. The prefix value represents the number of "1" of a sub net mask. The action indicates an output destination of the packet.

FIG. 8 shows an initial state. In the initial state, there are three entries #1 to #3. Let us consider a case where the entry #1 among them is the above-mentioned "target entry". Also, the permissible value used in the entry division determination is "count value=1000".

In FIG. 8, the count value regarding the target entry #1 exceeds the permissible value. Therefore, as shown in FIG. 9, the target entry #1 is divided into two partial entries (post-division entries) #4 and #5 (Step S150). It should be noted here that the match condition "10. 0. 0. 0/9" of the target entry #1 is divided into two and the post-division match conditions "10. 0. 0. 0/10" and "10. 64. 0. 0/10" are respectively assigned to the post-division entries #4 and #5. Meanwhile, the action and the priority are the same between the target entry #1 and the post-division entries #4 and #5. After that, the post-division entry #4 is set as a new target entry.

In FIG. 9, the count value regarding the target entry #4 exceeds the permissible value. Therefore, as shown in FIG. 10, the target entry #4 is divided into two partial entries (post-division entries) #6 and #7 (Step S150). It should be noted here that the match condition "10. 0. 0. 0/10" of the target entry #4 is divided into two and the post-division match conditions "10. 0. 0. 0/11" and "10. 32. 0. 0/11" are respectively assigned to the post-division entries #6 and #7. Meanwhile, the action and the priority are the same between the target entry #4 and the post-division entries #6 and #7. After that, the post-division entry #6 is set as a new target entry.

In FIG. 10, the count value regarding the target entry #6 is within the permissible value. Therefore, as shown in FIG. 11, the action of the target entry #6 is changed from "port 1" to "controller (=packet forwarding to the controller 100)" (Step S140). As a result, packets that match the match condition "10. 0. 0. 0/11" of the target entry #6 are forwarded to the controller 100.

Let us consider a case, as shown in FIG. 12, where two new entries #8 and #9 are thereafter added in response to the packet matching the target entry #6 (Steps S160 to S180). The new entry #8 is generated in response to a packet whose source IP address is "10. 1. 1. 1" and is an exact match entry whose match condition is "10. 1. 1. 1". Similarly, the new entry #9 is generated in response to a packet whose source IP address is "10. 1. 1. 2" and is an exact match entry whose match condition is "10. 1. 1. 2". Moreover, the new entry #8 has the same action as the action "port 1 (first action)" of the target entry #6 before the change, and is associated with the existing flow. On the other hand, the new entry #9 has an action "port 2 (second action)" different from the "port 1", and is associated with a new flow.

Let us consider a case where time-out thereafter occurs in the new entry #8". In this case, as shown in FIG. 13, the new entry #8 is deleted from the flow table TBL (Steps S230 to S240).

Here, since the new entry #8 having the old action "port 1" has disappeared, the remaining new entry #9 is integrated with the target entry #6. More specifically, as shown in FIG. 14, the action of the target entry #6 is changed to the action "port 2" of the new entry #9 (Steps S30 to S240). Furthermore, the new entry #9 is deleted.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2010-000368, filed on Jan. 5, 2010, the disclosure of which is incorporated herein in its entirely by reference.

The invention claimed is:

1. A switch network system comprising:
   a switch configured to perform packet processing by reference to a flow table; and
   a controller configured to control said flow table of said switch,
   wherein each entry in said flow table indicates a match condition and an action, and said switch refers to said flow table to execute processing designated by said action on a reception packet that matches said match condition,
wherein said controller comprises:
an entry control block; and
a flow table setting block,
wherein a target entry in said flow table is an entry whose action is to be changed to forwarding of said reception packet to said controller, and
said entry control block forecasts a load imposed on said controller when packets matching said match condition of said target entry are forwarded to said controller,
wherein if said load is within a permissible value, said flow table setting block instructs said switch to change said action of said target entry,
wherein if said load exceeds said permissible value, said entry control block repeats entry division processing until said load becomes within said permissible value,
wherein in said entry division processing,
said entry control block divides said target entry into a plurality of post-division entries, divides said match condition of said target entry into a plurality of conditions, and sets respective match conditions of said plurality of post-division entries to said plurality of conditions,
said flow table setting block instructs said switch to set said plurality of post-division entries in said flow table, and
said entry control block newly sets any of said plurality of post-division entries as said target entry.

2. The switch network system according to claim 1, wherein said controller further comprises a flow setting block,
wherein after said action of said target entry is changed to the forwarding of said reception packet to said controller, said flow setting block receives a packet matching said match condition of said target entry from said switch,
wherein said flow setting block determines, in response to said received packet, a new entry regarding a flow of said received packet, and
said flow table setting block instructs said switch to set said new entry in said flow table.

3. The switch network system according to claim 2, wherein said entry control block detects an entry where time-out occurs, and
said flow table setting block instructs said switch to delete said detected entry from said flow table.

4. The switch network system according to claim 3, wherein said action of said target entry before the change is a first action,
wherein said new entry includes:
a first new entry whose action is said first action; and
a second new entry whose action is a second action different from said first action,
wherein if time-out occurs in said first new entry, said entry control block determines to delete said first new entry and to change said action of said target entry to said second action, and
said flow table setting block instructs said switch to delete said first new entry and to change said action of said target entry to said second action.

5. The switch network system according to claim 1, wherein statistics information indicates a match state with respect to each entry of said flow table, and
said entry control block forecasts said load based on said statistics information.

6. The switch network system according to claim 5, wherein said switch generates said statistics information.

7. A controller that controls a flow table of a switch,
wherein each entry in said flow table indicates a match condition and an action, and
said switch refers to said flow table to execute processing designated by said action on a reception packet that matches said match condition,
wherein said controller comprises:
an entry control block; and
a flow table setting block,
wherein a target entry in said flow table is an entry whose action is to be changed to forwarding of said reception packet to said controller, and
said entry control block forecasts a load imposed on said controller when packets matching said match condition of said target entry are forwarded to said controller,
wherein if said load is within a permissible value, said flow table setting block instructs said switch to change said action of said target entry,
wherein if said load exceeds said permissible value, said entry control block repeats entry division processing until said load becomes within said permissible value,
wherein in said entry division processing,
said entry control block divides said target entry into a plurality of post-division entries, divides said match condition of said target entry into a plurality of conditions, and sets respective match conditions of said plurality of post-division entries to said plurality of conditions,
said flow table setting block instructs said switch to set said plurality of post-division entries in said flow table, and
said entry control block newly sets any of said plurality of post-division entries as said target entry.

8. A control method that controls a flow table of a switch by a controller,
wherein each entry in said flow table indicates a match condition and an action,
said switch refers to said flow table to execute processing designated by said action on a reception packet that matches said match condition, and
a target entry in said flow table is an entry whose action is to be changed to forwarding of said reception packet to said controller,
wherein said control method comprises:
a step of forecasting a load imposed on said controller when packets matching said match condition of said target entry are forwarded to said controller;
a step of instructing said switch to change said action of said target entry, if said load is within a permissible value; and
a step of repeating entry division processing until said load becomes within said permissible value, if said load exceeds said permissible value,
wherein said entry division processing comprises:
a step of dividing said target entry into a plurality of post-division entries, dividing said match condition of said target entry into a plurality of conditions, and setting respective match conditions of said plurality of post-division entries to said plurality of conditions;
a step of instructing said switch to set said plurality of post-division entries in said flow table; and
a step of newly setting any of said plurality of post-division entries as said target entry.

9. A non-transitory computer readable medium on which a control program is recorded,
wherein said control program causes said controller to execute the control method according to claim 8.

* * * * *